Figure 1:
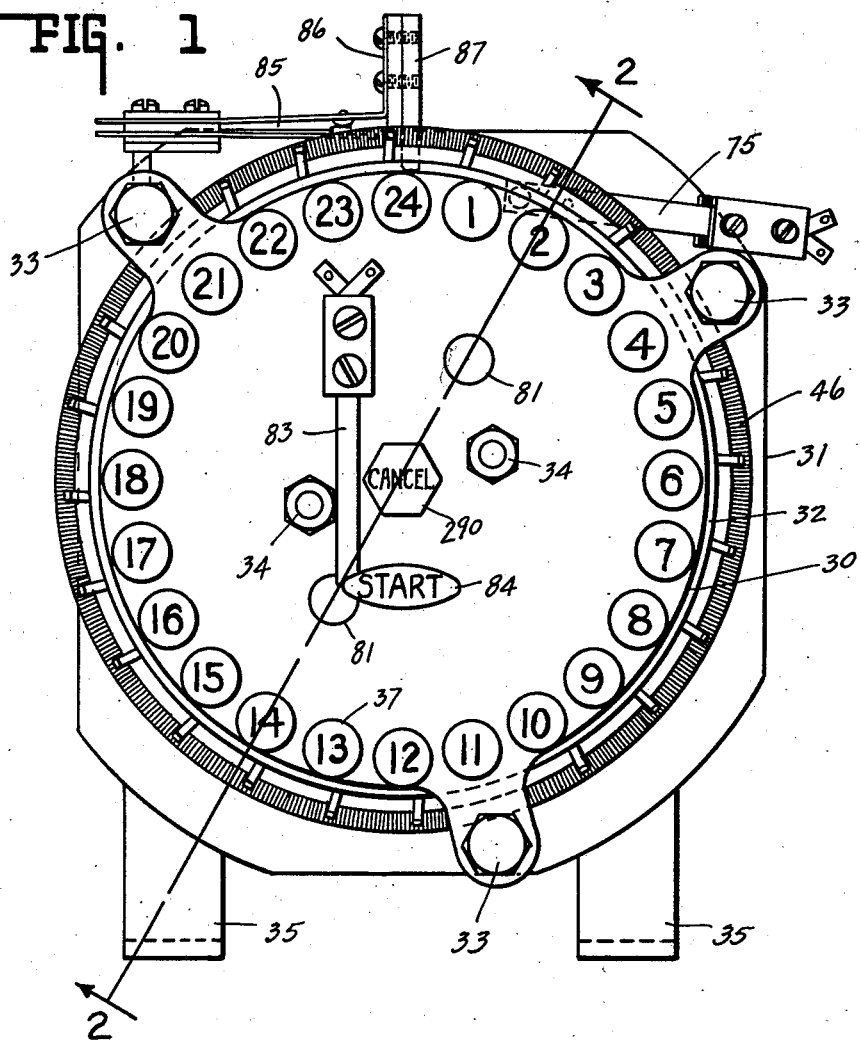

May 25, 1943.  F. H. OSBORNE ET AL  2,319,945
REMOTE CONTROL SYSTEM
Filed Nov. 24, 1939  8 Sheets-Sheet 1

INVENTORS.
FRED H. OSBORNE.
THEODORE M. WRIGHT,
BY Lockwood, Goldsmith & Galt,
ATTORNEYS.

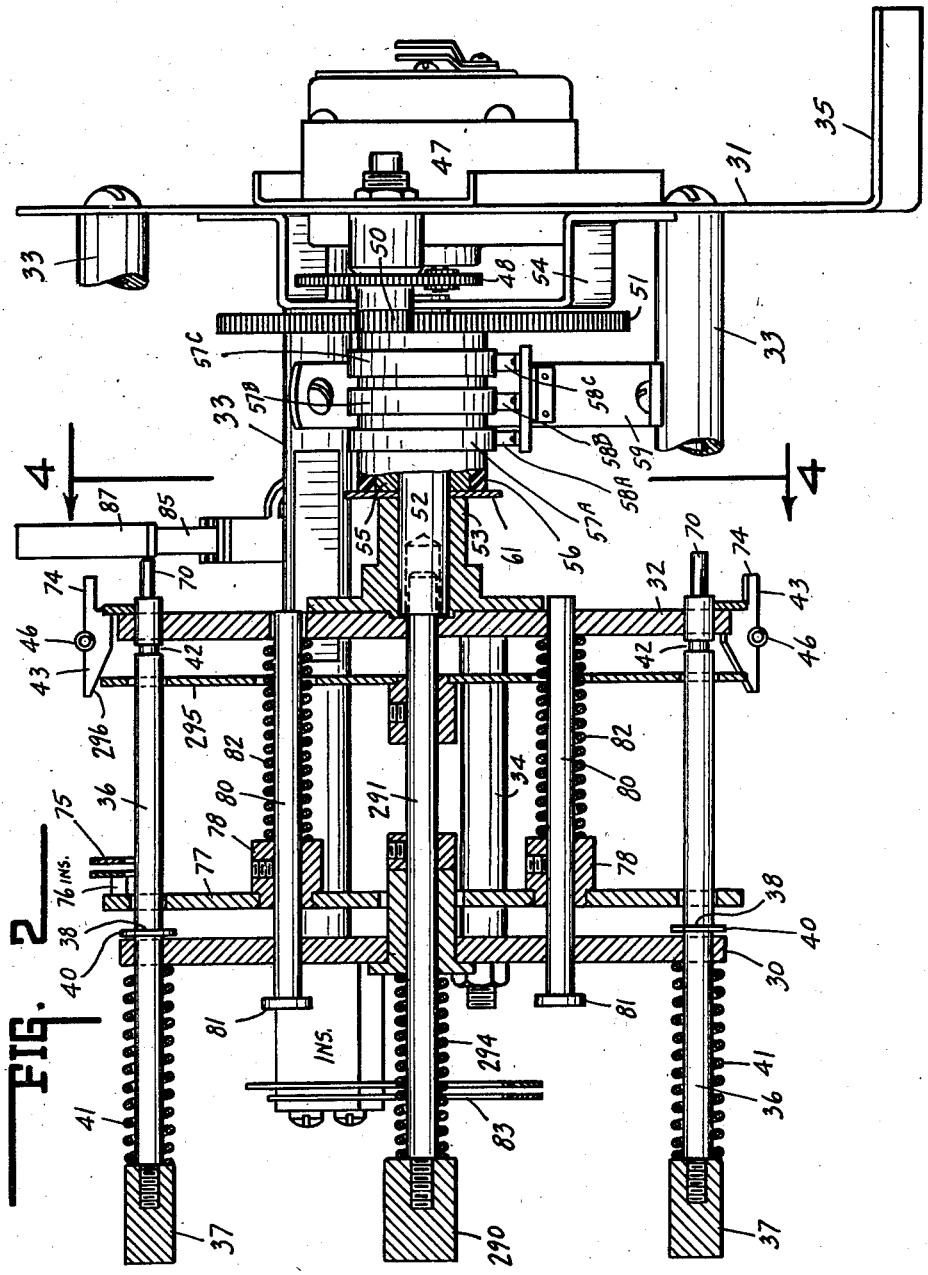

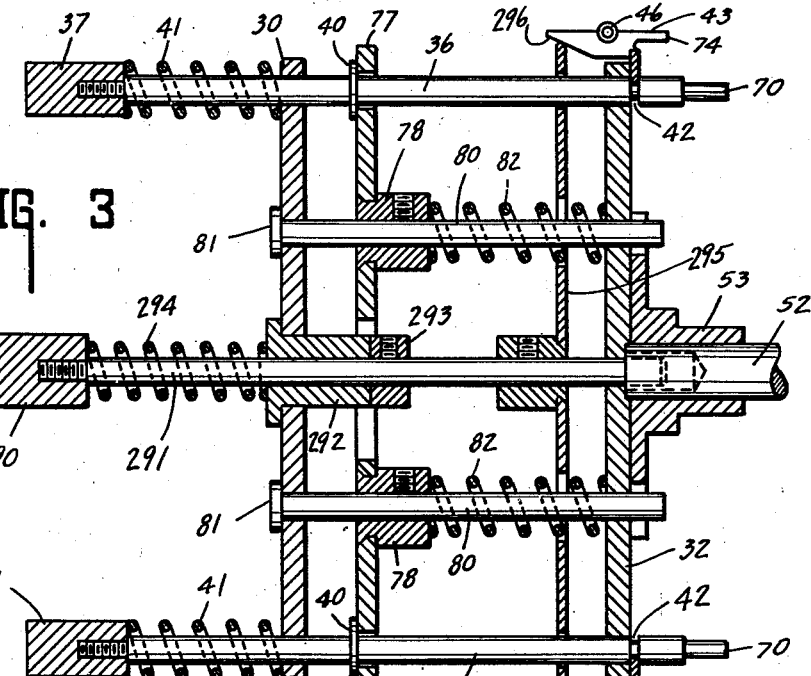
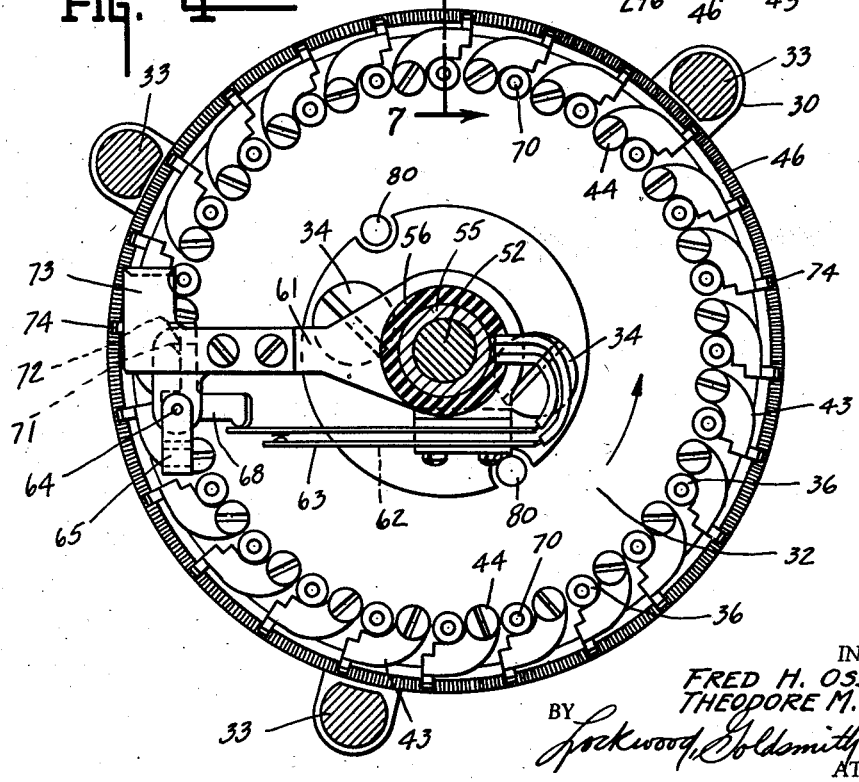

May 25, 1943.    F. H. OSBORNE ET AL    2,319,945
REMOTE CONTROL SYSTEM
Filed Nov. 24, 1939    8 Sheets-Sheet 4
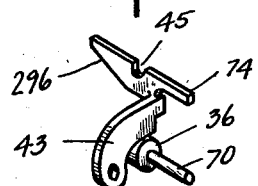
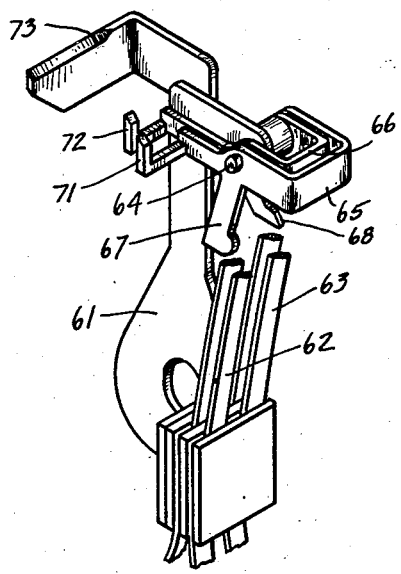
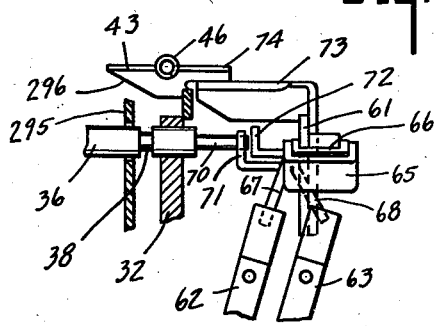
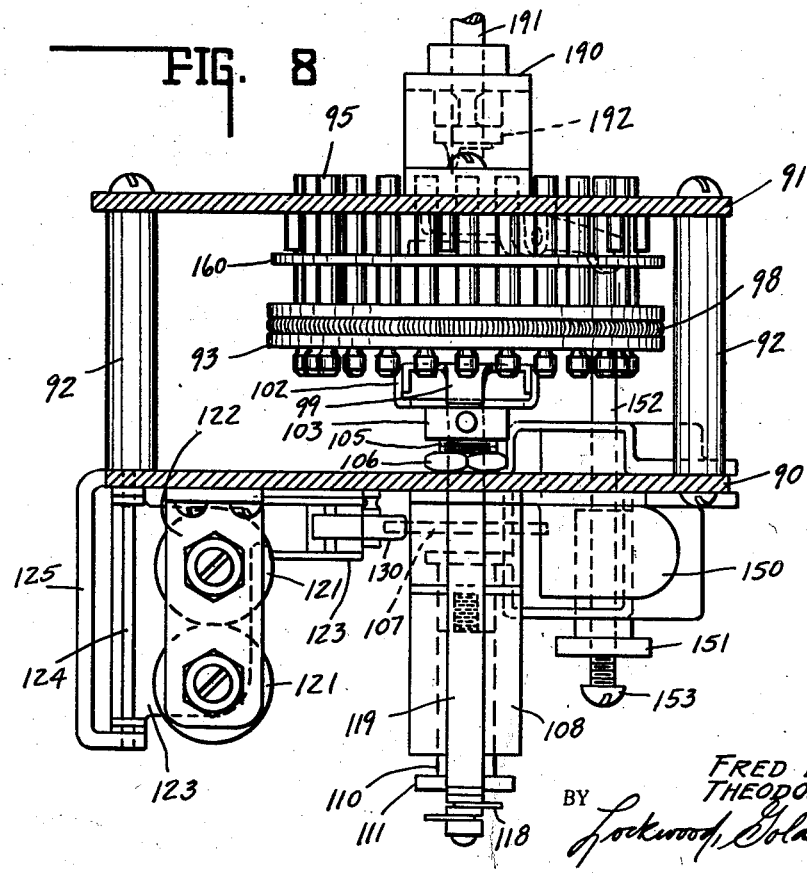
INVENTORS.
FRED H. OSBORNE.
THEODORE M. WRIGHT.
BY Lockwood, Goldsmith & Galt
ATTORNEYS.

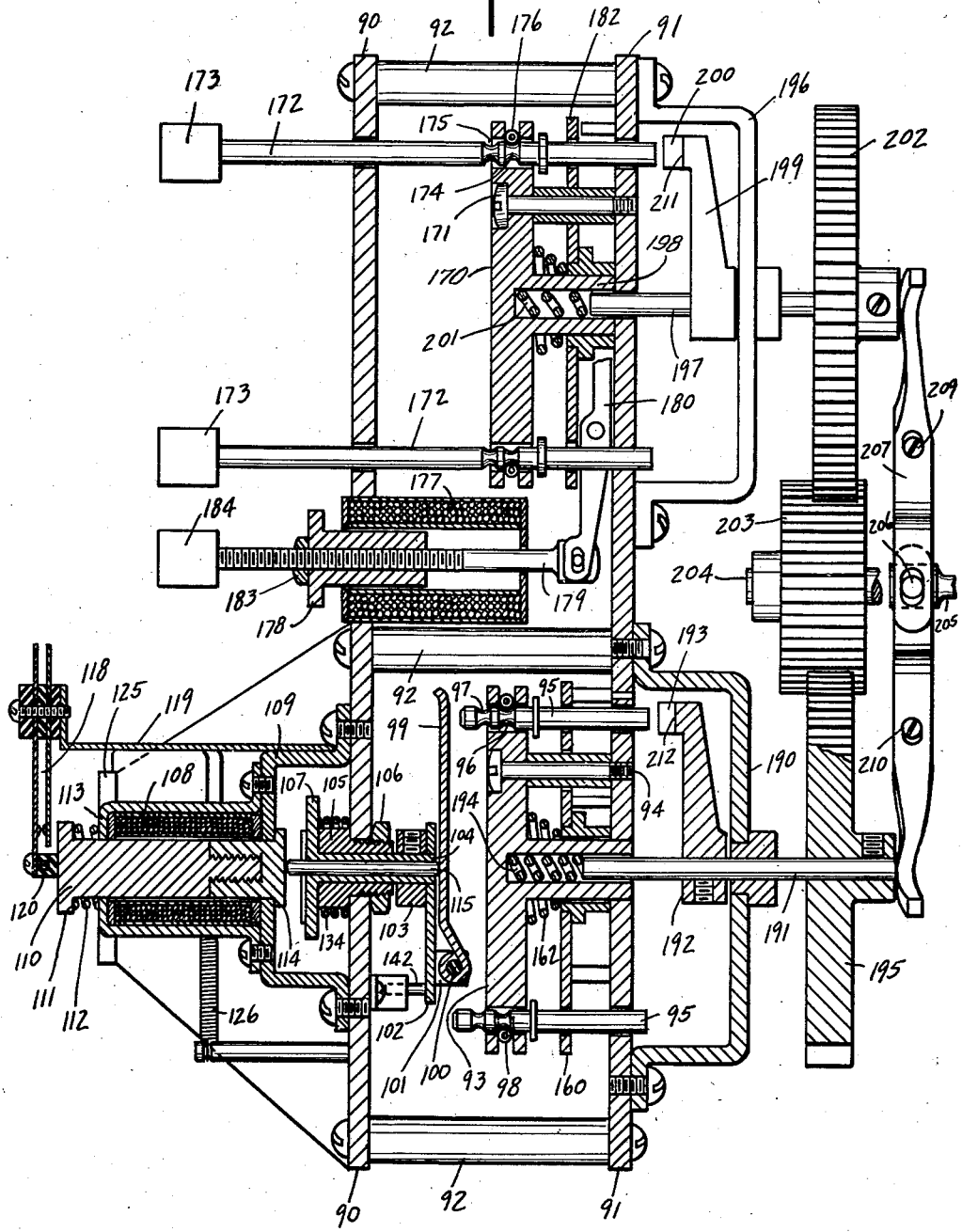

May 25, 1943.  F. H. OSBORNE ET AL  2,319,945
REMOTE CONTROL SYSTEM
Filed Nov. 24, 1939  8 Sheets-Sheet 7

INVENTORS.
FRED H. OSBORNE.
THEODORE M. WRIGHT.
BY Lockwood, Goldsmith & Galt.
ATTORNEYS.

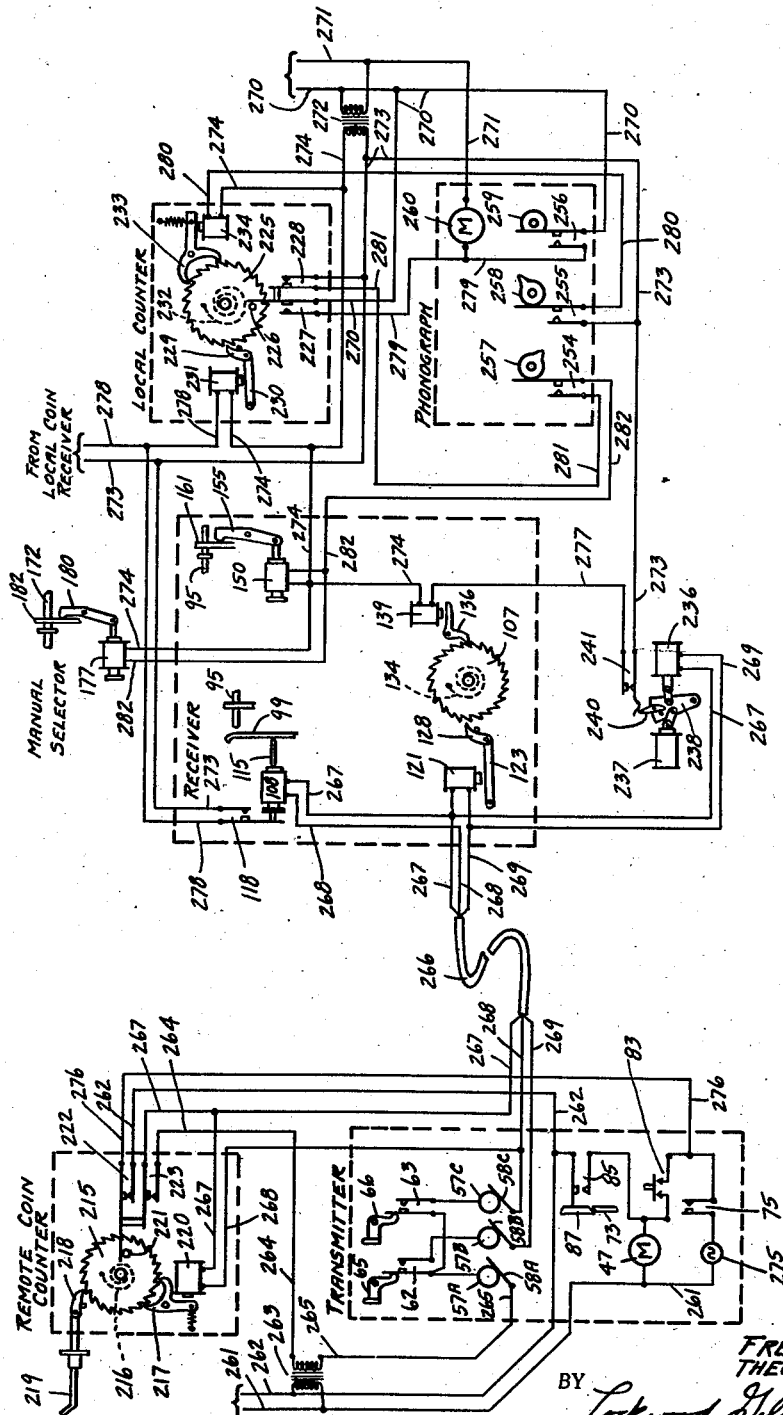

Patented May 25, 1943

2,319,945

UNITED STATES PATENT OFFICE 2,319,945

REMOTE CONTROL SYSTEM

Fred H. Osborne, Snyder, and Theodore M. Wright, North Tonawanda, N. Y., assignors to The Rudolph Wurlitzer Company, Cincinnati, Ohio, a corporation Application November 24, 1939, Serial No. 305,920

10 Claims. (Cl. 194—15)

This invention relates to a remote control system particularly adapted for the remote control of automatic musical instruments such as phonographs but having features applicable to other uses as well.

One object of the invention is to provide a remote control system which can be used in conjunction with a manual control system at the controlled machine.

Another object of the invention is to provide automatic means operated by the controlled machine for returning the parts of the remote and manual control systems to an initial idle condition at a predetermined time in the operation of the controlled machine.

Another object of the invention is to improve the construction of remote control transmission and receiving apparatus of the general type disclosed in copending application of Fred H. Osborne, Serial No. 272,162, filed May 6, 1939.

The preferred form of the invention described herein is applied to the general type of automatic phonograph shown in Wilcox Patent No. 2,002,236, but is equally applicable to other types of controlled machines. The system includes a transmitter located at a remote station and electrically connected to a receiver located adjacent the controlled machine. The transmitter includes a number of selector elements each of which controls one operation of the controlled machine, for example, the selection of a particular record to be played. A scanning member scans the positions of all of said elements and transmits a selection signal to the receiver each time an element is encountered which has been placed in a selected position. At the receiver a number of selector members are provided, each mechanically controlling one of the operations of the machine and each corresponding to one of the selector elements of the transmitter. A scanning member at the receiver is made to scan the positions of the receiver selector elements in synchronism with the movement of the transmitter scanning member and is operated each time a selection signal is received to place one of the receiver selector members in position to control the operation of the machine. The receiver is arranged in conjunction with a manual selection control so that the machine may be operated by either. When the system is to be coin controlled, coin receivers and counters are used at the remote station and at the manual control station.

Figure 9:
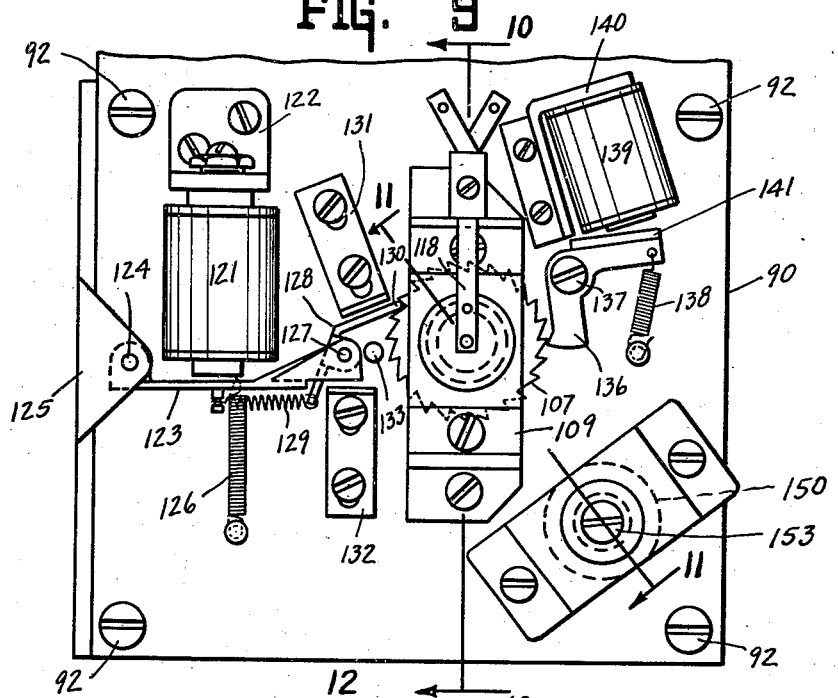
Figure 11:
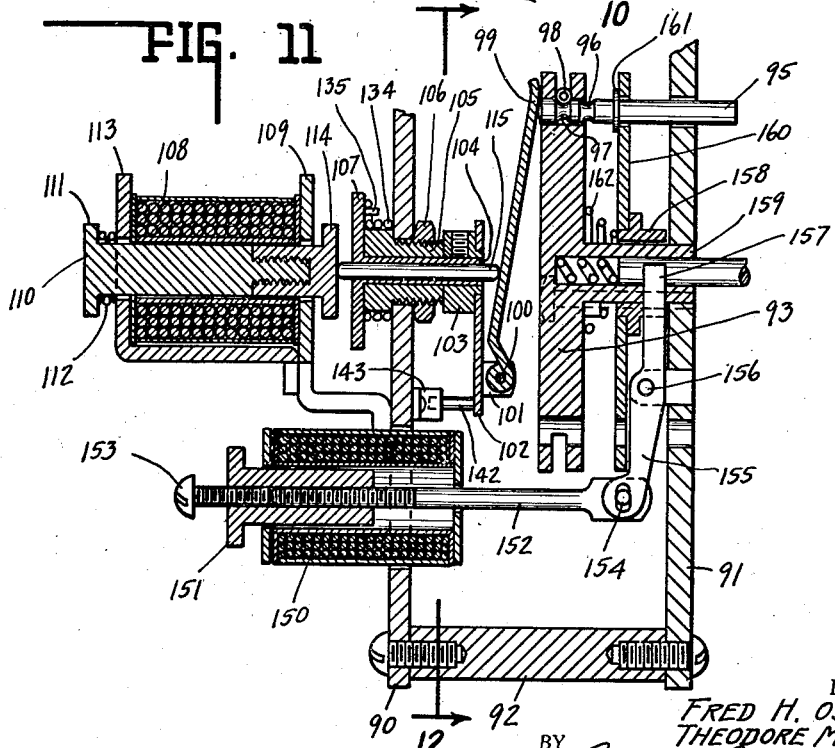
Figure 12:
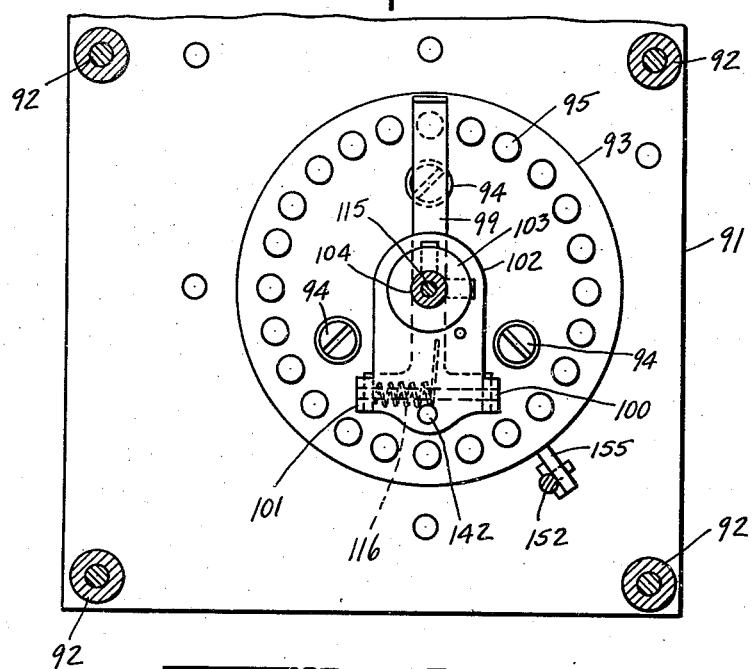
Figure 13:
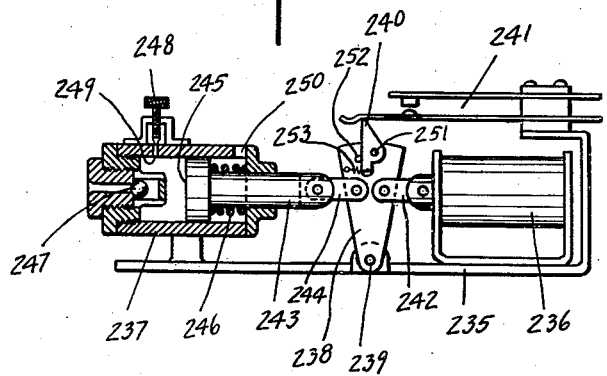

Other objects and features of the invention will be understood from the accompanying drawings and the following description and claims:

Fig. 1 is an elevational view of the face of a preferred form of transmitter. Fig. 2 is a side view of the same with parts in section, the sectional part being taken on the line 2—2 of Fig. 1. Fig. 3 is a similar view of some of the parts shown in Fig. 2 with some of said parts in a different position. Fig. 4 is an elevational sectional view taken on the line 4—4 of Fig. 2. Fig. 5 is a perspective view of a latch member and an associated part. Fig. 6 is a perspective view of the scanning mechanism of the transmitter. Fig. 7 is a side view of a portion of the same. Fig. 8 is a plan view of a preferred form of receiver; Fig. 9 is an end view of the same. Fig. 10 is a central vertical sectional view of the receiver and manual control unit taken on the line 10—10 of Fig. 9. Fig. 11 is a sectional view of a portion of the receiver taken on the line 11 of Fig. 9. Fig. 12 is a sectional view taken on the line 12—12 of Fig. 11. Fig. 13 is an elevational view of an auxiliary electric switching unit used with the invention. Fig. 14 is a diagram of electrical connections with certain mechanical parts diagrammatically shown.

Transmitter

A preferred form of transmitter for use in the invention is shown by way of illustration in Figs. 1 to 7, inclusive. The stationary frame of the transmitter consists of frame plates 30, 31 and 32, plates 30 and 31 being secured together by three spacer bolts 33 and plates 30 and 32 being secured together by two spacer bolts 34. Brackets 35 are secured to plate 31 and may be used to fasten the transmitter within a wall box or cabinet.

A plurality of selector pins 36 are slidably mounted in suitable holes in the plates 30 and 32 and each carries a push button 37. Said push buttons project beyond the wall of the wall box or cabinet (not shown) and are accessible to an operator. Each push button carries a number, 1 to 24, inclusive, in Fig. 1, corresponding to the number of a given phonograph record as indicated by the usual index. Each selector pin 36 is provided with a circumferential groove 38 (Fig. 2) fitted with a C-washer 40 normally bearing against the rear face of the frame plate 30. Compression springs 41 surround the selector pins between the plate 30 and the push buttons 37 and normally hold the pins in their idle or non-selected positions, with the C-washers 40 against plate 30.

Adjacent the rear end of each selector pin there is a circumferential groove 42 engageable by a latch member 43 which is shown in detail in Fig. 5. Said latch members are mounted on the rear face of the plate 32 by pivot screws 44 (Fig. 4) and are provided with semi-circular grooves 45 in their upper faces adapted to receive a helical tension spring 46 which engages the grooves of all of said latch members and normally retains the same in contact with the rearwardly projecting ends of the selector pins 36. When one of said pins is pressed to the right in Fig. 2 to make a selection, the spring 46 forces the corresponding latch member into the groove 42 and retains said pin in the selected position against the pressure of the spring 41. The positions of two of the pins 36 when so held is shown in Fig. 3.

An electric motor 47 is mounted on the frame plate 31 and is connected through a gear train 48, 50 and 51 to a shaft 52 journalled in a bearing 53 mounted on frame plate 32 and in a bracket 54 mounted on frame plate 31. Said shaft has secured thereto a bushing 55 carrying an insulating sleeve 56 in turn carrying three slip rings 57A, 57B and 57C. A series of brushes 58A, 58B and 58C mounted on a bracket 59 secured to two of the spacer bolts 33 engage said slip rings.

The bushing 55 also has secured thereto a scanning arm 61 best seen in Fig. 6 and carrying a pair of leaf switches 62 and 63 suitably insulated therefrom. At the outer end of said scanning arm there are mounted on a pivot pin 64 a pair of trip members 65 and 66. The trip member 65 is provided with a downwardly extending arm 67 adapted to engage and operate the switch 62. The trip member 66 is provided with a similar arm 68 adapted to operate the switch 63. Each of the selector pins 36 carries at its inner end a reduced extension 70 lying in the path of travel of a pair of triggers 71 and 72 carried respectively by the trip members 65 and 66. When a given pin is in its non-selected position, said extension engages only the trigger 71 in the rotation of the scanning arm 61 (Fig. 7). When any of the pins 36 has been placed in its selected position, however, the extension 70 reaches the path of both of said triggers. The scanning arm 61 also carries a trip member 73 shaped to engage projections 74 on the latch members 43 and to move said latch members outwardly to free the corresponding pins 36.

By means of the construction just described, the operation of the motor 47 rotates the scanning arm 61 in the direction of the arrow of Fig. 4 and brings the trigger 71 on trip member 65 into engagement with all of the extensions 70. Each such engagement causes movement of trip member 65 to close momentarily the switch 62. If one or more of the pins 36 have been placed in selected position, the trigger 72 on trip member 66 strikes the corresponding extension 70 and similarly operates the switch 63. Thus switch 62 is operated each time trigger 71 passes a selector pin whether selected or not and switch 63 is operated only when trigger 72 passes a selected pin 36. The two triggers are so placed that the operation of switch 63 takes place at an appreciable time interval after the corresponding operation of switch 62. The trip member 73, following the triggers 71 and 72 in their rotation, resets such of the pins 36 as have been used in making selections.

Referring now to Fig. 1, there is shown mounted on one of the spacer bolts 33 and suitably insulated therefrom a leaf switch 75. In the operation of the apparatus said switch must be closed whenever any one of the pins 36 have been selected but open when none of said pins are in the selected position. The purpose of this operation will be later described. The leaves of said switch are shown in Fig. 2 and one of said leaves carries an insulation block 76 engaging the face of a disc 77. Said disc has suitable openings through which the pins 36 may freely pass and has secured thereto a pair of bushings 78 in turn secured to a pair of rods 80 slidably guided in the frame plates 30 and 32 (Fig. 3). The rods 80 are provided with heads 81 adapted to engage the face of the frame plate 30 to limit the travel of said rods and the disc 77 carried thereby. A pair of compression springs 82 are interposed between the bushings 78 and plate 32 and normally maintain the assembly just described in a left-hand position referring to Fig. 2. In this position pressure of disc 77 on block 76 is sufficiently relieved to permit switch 75 to remain open. When any one of the selector pins 36 is operated, the C-washer 40 carried thereby strikes the face of disc 77, moves the same to the right as shown in Fig. 3 and thus closes switch 75. The switch remains closed until all of the pins 36 have been returned to cleared or non-selected position.

In Fig. 1 there is shown a leaf switch 83 mounted on the face of plate 30 and suitably insulated therefrom. Said switch is manually operated by a push button 84 marked "Start."

A leaf switch 85 is mounted on one of the spacer bolts 33 and insulated therefrom. The upper leaf of said switch has an upward extension 86 carrying an insulation block 87 extending downwardly into the path of travel of the trip member 73 carried by the scanning arm 61. In the idle position of the apparatus said switch is held open by the trip member 73. The first movement of the scanning arm 61 permits the switch to close and it is not again reopened until a complete revolution has been made by the scanning arm.

To provide means by which the operator may correct errors of choice in the selector pins 36, a push button 290 marked "Cancel" is mounted on a pin 291 slidably guided in a bushing 292 carried by the frame plate 30 and in a recess in the end of shaft 52. Said pin carries a collar 293 normally held in engagement with the bushing 292 by a spring 294 interposed between said bushing and the push button 290. The pin 291 carries a disc 295 perforated for free passage of the pins 36, the springs 82 and spacer bolts 34 and having its periphery positioned to engage the inclined inner edges 296 of the latch members 43 (Fig. 3). When the cancel button 290 is pressed, the periphery of said disc presses said latch members outwardly against the action of spring 46 and frees all of the selector pins 36 which may have been placed in selected position.

*Receiver*

Figs. 8, 9, 10, 11 and 12 illustrate a preferred form of the receiving apparatus for use with the invention. A pair of frame plates 90 and 91 are secured together by spacer bolts 92 and form the principal part of the stationary frame of the device. A plate 93 secured to the plate 91 by spacer bolts 94 is also a part of the stationary frame. A plurality of selector pins 95 are slidably mounted in the plates 91 and 93 and each of said pins corresponds to one of the pins 36 of the transmitting mechanism. Each pin is provided with a pair of arcuate grooves 96 and 97 engageable by an endless coil spring 98 seated in a peripheral groove in the plate 93. When the pins are in the normal or non-selected position shown in Fig. 10, the spring 98 engages the grooves 96 and yieldingly retains the same in said position. When any one of the pins has been moved to a selected position shown in Fig. 11, the spring 98 engages the groove 97 and similarly retains the pin in that position.

For moving the pins to the selected position, there is provided a hammer 99 which is pivotally mounted on a pin 100 in turn seated in ears 101 struck from the edges of a plate 102, the shape of which is best seen in Fig. 12. Said plate has secured thereto a hub 103 in turn secured to a bushing 104 which is journalled in a bearing 105 secured to the plate 90. Said bearing is held in place by a lock nut 106. The bushing 104 carries at its opposite end a ratchet wheel 107 which is rotatable by means to be described to place the hammer 99 successively in register with the several pins 95.

Apparatus for causing the hammer 99 to strike the pins 95 is operated by a magnet 108 mounted on a bracket 109 secured to the plate 90. Said magnet is provided with a core 110 of magnetic material having a flange 111 serving as a seat for a compression spring 112 interposed between said flange and the shell 113 of the magnet. The core 110 is secured to a false core 114 of non-magnetic material, such as brass, by means of screw threads, as best seen in Fig. 11. The false core engages a pin 115 slidably mounted in the bushing 104 and the opposite end of which engages the hammer 99. The hammer 99 is normally retained in the position shown in Fig. 10 by a torsion spring 116 surrounding the pin 100 and anchored at one end to one of the ears 101 and having its other end engaging the face of the hammer. At the same time, the spring 112 normally holds the core 110 in the position shown in Fig. 10. A momentary actuation of the magnet 108 draws the core 110 to the right against the action of the spring 112 and causes the pin 115 to strike the hammer 99 and to force said hammer against the selector pin 95 with which said hammer is then in register. When said magnet is again deenergized the parts resume the position shown in Fig. 10.

An electric switch 118 is mounted on, and suitably insulated from a bracket 119 secured to the plate 90 (Fig. 10). One of the leaves of said switch carries an insulation block 120 engageable by the core 110 and normally holding said switch in the open position when the parts are in the position shown in Fig. 10. At each operation of the magnet 108, the pressure of core 110 on switch 118 is released and the switch is allowed to be closed for a purpose to be described hereinafter.

Mechanism for revolving the hammer 99 to register the same with the successive pins 95 is operated by a pair of magnets 121 connected in series or parallel to operate simultaneously as a single unit and mounted on a bracket 122 secured to the plate 90. For sake of simplicity the two magnets 121 are shown in the wiring diagram, Fig. 14, as the equivalent single unit and are so considered in the description of the wiring circuits. An armature 123 is pivotally mounted on a pin 124 which is in turn mounted on a bracket 125 extending from the plate 90. Said armature is positioned beneath the magnets 121 and is drawn upwardly thereby against the action of a spring 126 each time said magnets are energized. The armature 123 carries a pivot pin 127 on which there is mounted a dog 128, one end of which has secured thereto a tension spring 129 normally urging the same in the clockwise direction of Fig. 9. The nose 130 of said dog is adapted to engage the teeth of the ratchet 107 when the magnets 121 are energized as shown in Fig. 9. The upward movement of the armature 123 is limited by an adjustable stop 131 secured to the plate 90 and the downward movement thereof is limited by a similar stop 132. A pin 133 engages the dog 128 when the same is in its lower position and holds the nose 130 out of engagement with the teeth of the ratchet 107. By means of this construction the ratchet 107 and the hammer 99 are moved a distance corresponding to one ratchet tooth each time the magnets 121 are energized. The teeth of the ratchet are so spaced that each such movement carries the hammer 99 from one of the pins 95 to the next.

A torsion spring 134 has one end anchored to the bearing 105 and the opposite end engaging a pin 135 on the back of the ratchet wheel 107. Said spring normally urges said ratchet in the clockwise direction of Fig. 9, but movement in that direction is normally prevented by a pawl 136 pivotally mounted on a pin 137 secured to the plate 90. A tension spring 138 maintains said pawl in engagement with the ratchet 107. An electromagnet 139 is mounted on a bracket 140 secured to the plate 90 and when energized attracts an armature 141 secured to the pawl 136 and removes the pawl from engagement with the ratchet. The subsequent action of spring 134 rotates the ratchet and hammer in the counterclockwise direction until a pin 142 carried by the plate 102 strikes a stop 143 secured to the rear face of the plate 90. When this occurs, the hammer 99 is in its normal idle position approximately half way between the pins 95 corresponding to the transmitter buttons No. 1 and No. 24. In this position the ratchet teeth are so placed in relation to the dog 128 that the first movement of said dog carries the hammer 99 only to the position of the pin 95 corresponding to the transmitter pin No. 1.

Apparatus for resetting all of the selector pins 95, or such of said pins as may be in the selected position is operated by an electromagnet 150 mounted on the plate 90 and provided with a core 151. Said core is threadedly engaged with a stem 152 which is held in adjusted position with relation to the core by a set screw 153. The stem 152 has a pin-and-slot connection 154 with a yoke lever 155 pivotally mounted at 156 on the plate 91. The opposite end of said lever is in the shape of a fork 157 engaging a bushing 158 which is slidably mounted on a boss 159 extending from the plate 93. The bushing 158 has secured thereto a disc 160 suitably perforated for free passage of the pins 95 and adapted to engage C-washers 161 carried in suitable grooves in said pins. A spiral compression spring 162 is interposed between the disc 160 and the face of plate 93 and normally retains the parts in the position shown in Fig. 11. By means of this construction, a momentary energization of the magnet 150 draws the core 151 to the right in Fig. 11 and moves the disc 160 to engage the C-washers 161 of any of the pins 95 which have been placed in the selected position. Said pins are thus returned to their idle non-selected position.

Manual selector

The receiving apparatus just described is adapted to operate in conjunction with a manual selecting device located at the phonograph and shown in detail in Fig. 10. Said device is mounted on the plates 90 and 91 and includes a stationary disc 170 secured to the plate 91 by spacer bolts 171. Selector pins 172 are slidably mounted on the disc 170 and plate 91 and are provided at their outer ends with push buttons 173 extending to a position accessible to an operator. The pins 172 are provided with annular grooves 174 and 175 engaged by a spring 176 to maintain the pins in their idle and selected positions respectively. A magnet 177 operates through a core 178, a stem 179, yoke lever 180, bushing 181 and disc 182 to reset the pins 172 in the same manner that pins 95 are reset by the magnet 150. The stem 179 is held in adjusted position with respect to the core 178 by a lock nut 183 and has a portion extending through said core and carrying a push button 184 acsessible to an operator for manual cancellation.

Mechanical connections to phonograph

The mechanical connections by means of which pins 95 or 172 control the selection of records in the phonograph is preferably similar to that described in Wilcox Patent No. 2,002,236 and only so much of it as is necessary to show the inter-relation of the remote control apparatus and the manual selector will be described herein. Other forms of mechanical connections may be similarly used.

Referring to Fig. 10, the plate 91 carries a bridge 190 in which there is journalled a shaft 191 also journalled in a recess in the boss 159. Said shaft carries a scanning arm 192 having an inturned portion 193 adapted to scan the positions of the pins 95 as the shaft 191 is rotated. A compression spring 194 within the boss 159 normally retains the shaft in the position shown in Fig. 10. A gear 195 is mounted on the outer end of said shaft.

The plate 91 also carries a bridge 196 in which is journalled a shaft 197 also journalled in a boss 198 on the disc 170. The shaft 197 carries a scanning arm 199 having an inturned portion 200 adapted to scan the positions of the pins 173. A compression spring 201 within the boss 198 holds the parts in the position of Fig. 10. A gear 202 is secured to the shaft 197. The gears 195 and 202 are engaged by a pinion 203 mounted on a shaft 204 which is rotated in the movement of the record-selecting mechanism of the phonograph until one of the scanning arms 192 or 199 strikes a pin 95 or 172 which has been placed in the selected position. When this occurs the record-selecting mechanism of the phonograph is stopped in position to select the record corresponding to the pin engaged. The phonograph mechanism then operates through a cycle in which the record is placed in playing position, is played and removed from playing position. At a predetermined time in this cycle of operations, a rod 205 is moved to the right in Fig. 10 by suitable mechanical connection with the phonograph mechanism. Said rod has a pin-and-slot connection 206 with a pair of levers 207 and 208 which are pivotally mounted on pivot screws 209 and 210 carried by suitable stationary parts of the machine. Said levers engage the hubs of gears 202 and 195 respectively and when moved by the rod 205 they press the shafts 191 and 197 to the left. This movement brings a face 211 of the scanning arm 199 or a face 212 of the scanning arm 192 against the selector pin which has been used to stop the record selecting mechanism and returns said pin to its idle position.

Auxiliary devices

Auxiliary devices for use with the transmitter and receiver already described include a remote coin counter, a simple form of which is shown diagrammatically in Fig. 14 and indicated by name. The type of coin counter shown in co-pending application of Fred H. Osborne, Serial No. 272,162, filed May 6, 1939, and in co-pending application of Fred H. Osborne and Theodore M. Wright, now Patent No. 2,216,624, issued October 1, 1940, may also be used. The counter may be positioned at the remote station near the transmitter or may be housed in the same cabinet or wall box therewith. The device includes a ratchet wheel 215 which is urged in a counterclockwise direction by a torsion-spring 216 and is normally held from rotation in that direction by an escapement 217. A dog 218 attached to a well known form of coin slide 219 engages the teeth of the ratchet and moves the same one notch in the clockwise direction each time a coin is inserted in the slide and the slide is pressed home. Similar slides receiving coins of larger denomination may be added and may operate with ratchet wheels on the same shaft with wheel 215 to move the same through proportionately greater distances as described in said co-pending applications.

An electromagnet 220, when energized, attracts the tail of the escapement 217 and permits the spring 216 to rotate the ratchet one notch in the opposite direction. An insulated pin 221 carried by the ratchet wheel 215 operates a pair of leaf switches 222 and 223. Normally the switches are open as shown in Fig. 14 when no coins have been received which have not been checked off by operation of the magnet 220. When one or more coins have been received and the ratchet has been rotated in the clockwise direction, pin 221 frees the switches and permits them to close. The switches remain closed until the magnet 220 has been energized a number of times proportionate to the value of coins which have been deposited.

Another auxiliary device shown diagrammatically and indicated by name in Fig. 14 is the local counter. In this device there is provided a ratchet wheel 225 carrying a pin 226 operating a pair of switches 227 and 228. The switch 227 is the main switch for the phonograph operation and is normally open when the parts are in their idle position. The switch 228 is normally closed. The ratchet may be rotated in the clockwise direction by a dog 229 carried by an armature 230 of an electromagnet 231 and when so rotated, the switch 227 is closed and the switch 278 is opened. Return movement of the ratchet is accomplished by a torsion spring 232 when an escapement 223 is operated by a checkoff magnet 234. This device is well known in the automatic phonograph art and is subject to considerable variation in detail. In many installations, the escapement is operated mechanically by movement of parts of the record changing mechanism. However, electrical operation is shown herein for the sake of simplicity of description.

Another auxiliary device is shown in detail in Fig. 13 and diagrammatically in Fig. 14. This device includes a base 235 carrying an electromagnet 236 and a dashpot 237. A lever 238 is pivotally mounted at 239 on the base and carries a dog 240 adapted to engage and actuate a leaf switch 241. The lever 238 is connected to the plunger of the magnet by a link 242 and to the plunger 243 of the dashpot by a link 244. A piston 245 is carried by the plunger 243 and is urged to the left by a compression spring 246. A ball check valve 247 mounted in the end of the dashpot permits rapid inflow of air as the piston moves to the right but is closed as the piston moves to the left. A needle valve 248 cooperating with a port 249 restricts the outflow of air as the piston moves to the left. An opening 250 in the wall of the dashpot prevents increase of pressure on the reverse side of the piston. The dog 240 is pivoted to the lever 239 by a pin 251 and is held against a stop pin 252 by a tension spring 253.

In the operation of this device an actuation of the magnet 236 moves the parts to the right and may do so at a rapid rate since the ball check valve 247 permits rapid inflow of air to the dashpot. In this movement the dog 240 strikes the switch 241 but is turned on its pivotal mounting and thus fails to actuate the switch. When the magnet 236 is deenergized, the spring 246 tends to return the parts to the left. The speed of return is controlled by the adjustment of the needle valve 248 and is so adjusted that the dog 240 will not reach the switch 241 during the period of time that the scanning arm 61 of the transmitter is moving from the position of one of the selector pins 36 to the next. Successive actuations of the magnet 236 occurring with this frequency therefore prevent operation of the switch 241. A cessation of such actuations, however, permits the spring 246 to return the parts to the limit of their left-hand movement and in so doing to engage the dog 240 with the switch 241 and close the same for an appreciable period. At the end of said movement, the switch is again open as shown in Fig. 14.

The phonograph electrical parts

Only so much of the electrical parts of the phonograph are shown in Fig. 14 as are necessary for an understanding of the invention. In automatic record-changing phonographs, the record-changing mechanism ordinarily runs through a cycle of operations for each record played. During this cycle the several electric circuits are made and broken at appropriate intervals by cams or other mechanical means. In the present instance there are illustrated three switches 254, 255 and 256 operated respectively by cams 257, 258 and 259. Each of said cams may be assumed to make one complete revolution for each record-changing cycle. There is also shown a motor 260 which may be assumed to supply motive power for the record-selecting mechanism, for the record-changing mechanism and for the rotation of the turntable in playing the record. The electrical mechanism shown is selected for simplicity of description. The connections to other forms of phonographs using more complicated circuits will be obvious.

Wiring

In the wiring diagram of Fig. 14 there are illustrated the electrical parts already described and certain of the mechanical parts associated therewith. In addition, there are shown a pair of power mains 261 and 262 which may be connected to any suitable source of current at the remote station and serve for local power supply. Preferably, the usual 110 volts, 60 cycle alternating current is used. A transformer 263 has its primary winding connected to the power mains 261 and 262 and furnishes low voltage current to a pair of distributories 264 and 265 for the operation of certain control circuits. A cable 266 carries three conductors 267, 268 and 269 from the remote station to the receiver located at the phonograph. At the phonograph a pair of power mains 270 and 271 are connected to any suitable source of current and supply power for the circuits of the motor 260. A transformer 272 has its primary windings connected to the power mains 270 and 271 and supplies suitable low voltage current to a pair of distributory conductors 273 and 274. The remainder of the wiring can best be described in connection with a resume of the operation of the system as a whole. In this description, conductors will be referred to by reference number only in describing the circuits of which they form a part.

Operation

In the normal idle position of the apparatus, all of the electrical parts are in the position shown in Fig. 14 and no crcuits are complete. The trip member 73 is in engagement with the insulation block 87 and retains switch 85 open. The trip members 65 and 66 are in position with their triggers between the two selector pins 36 carrying push buttons Nos. 1 and 24 and all of the selector pins are in the idle or non-selected position. At the receiver, all of the pins 95 are in the non-selected position and the hammer 99 is in position midway between the two pins 95 corresponding to push buttons Nos. 1 and 24. Said hammer is held in that position by the engagement of the pin 142 and stop 143. The manual selector pins 172 are in non-selected position.

Let it be assumed that the operator at the remote station wishes to choose five selections and to deposit coins of an appropriate value. He may first press the five selector push buttons 37 or he may first deposit the coins as desired. The operation of the push buttons places the chosen pins 36 with their extensions 70 in the path of travel of the trigger of trip member 66. The receipt of the coins moves the ratchet 215 five steps in the clockwise direction and closes switches 222 and 223. The operation of the selector pins also closes switch 75. The completion of both of these operations establishes a circuit for a signal lamp 275, (power main 261, lamp 275, switch 75, 276, switch 222, power main 262). The operation of switches 222 and 223 have no other immediate result. The signal lamp indicates that selections have been made and paid for but not yet transmitted to the receiver.

The operator next presses the start push button 84 and closes switch 83, completing a circuit for the transmitter motor 47 (power main 261, motor 47, switch 83, 276, switch 222, power main 262). The first movement of the transmitter motor carries the trigger member 73 past the insulation block 87 and permits switch 85 to close. The operation of said switch completes a hold-in circuit for the motor 47 (power main 261, motor 47, switch 85, power main 262). This circuit remains completed and continues the operation of the motor until the scanning arm 61 has made one complete revolution irrespective of the operation of switch 222 or the opening of the starting switch 83 when the operator withdraws his finger from the start push button 84.

In the rotation of the scanning arm 61 the trigger 65 strikes each of the extensions 70 of the selector pins 36. At each such engagement the switch 62 is momentarily closed and a circuit is momentarily completed for the magnet 121 (transformer 263, 264, switch 223, 267, magnet 121, 269, brush 58B, slip ring 57B, switch 62, slip ring 57A, brush 58A, 265, transformer 263). The first actuation of the magnet 121 moves the hammer 99 from its initial position into register with the pin 95 corresponding to push button No. 1 and each succeeding actuation moves the hammer to a succeeding pin 95. Thus the hammer 99 keeps step with the movement of the scanning arm 61 in response to indexing signals transmitted to the magnet 121 by each actuation of switch 62.

The magnet 236 is connected in parallel with magnet 121 by branches of the conductors 267 and 269 and is thus repeatedly energized in synchronism therewith. The first actuation of said magnet moves the dog 240 to its right-hand position without actuating switch 241. Succeeding actuations take place too rapidly to permit said dog to return far enough to actuate said switch.

During the scanning operation of the arm 61, the trigger 66 strikes the extension 70 of each of the pins 36 which have been placed in selected position. At the time of each such engagement the hammer 99 is in register with the pin 95 corresponding to the selected pin 36, and each such engagement momentarily closes the switch 63 and completes a circuit for a selection signal in response to which said hammer is operated (transformer 263, 264, switch 223, 267, magnet 108, 268, brush 58C, slip ring 57C, switch 63, slip ring 57A, brush 58A, 265, transformer 263). Each actuation of magnet 108 by means of this circuit, operates the hammer 99 to place the appropriate selector pin 95 in the selected position.

Branches of the conductors 267 and 268 also lead to the check-off magnet 220 in the remote coin counter. Said magnet is, therefore, actuated each time that magnet 108 is actuated and operates the coin counter to check off one coin value. In the assumed example, when five such actuations have taken place, the ratchet 215 returns to normal position and opens switches 222 and 223. The opening of switch 222 extinguishes the lamp 275 but does not stop the motor 47 since the operation of said motor continues by the circuit through switch 85. The opening of switch 223 however prevents further actuations of magnets 121, 236, 108 and 220 since the circuits of all of said magnets pass through said switch. Thus no selections are transmitted which have not been paid for, even though more of the push buttons 37 have been pressed than are warranted by the value of the coins deposited. The rotation of motor 47 continues to the end of a complete revolution of arm 61 during which all of the pins 36 are returned to initial position by trip member 73 whether the selections corresponding thereto have been transmitted or not.

The opening of switch 223, when the last selection signal is transmitted, prevents further actuation of magnet 236. The slow return movement of the dog 240 under control of the dashpot 237 closes switch 241 and completes a circuit for magnet 139, (transformer 272, 273, switch 241, 277, magnet 139, 274, transformer 272). Said circuit maintains the magnet 139 in an energized condition sufficiently long for the spring 134 to return the hammer 99 to its initial position.

Each operation of the hammer 99 by the magnet 108 is accompanied by a momentary closing of the switch 118. Each operation of said switch completes a circuit for the magnet 231 of the local counter (transformer 272, 273, switch 118, 278, magnet 231, 274, transformer 272). Each such actuation sets up a coin value in the local counter and the first of said actuations permits the main switch 227 to be closed and the switch 228 to be opened. Branches of the conductors 273 and 278 also lead to a local coin receiver at the phonograph which may be of a well known type adapted to make contact between said conductors each time a coin of a certain value is inserted and to make multiple contacts for coins of larger value. Thus the local counter may be operated either by remote control or by the local coin receiver.

The closing of the main switch 227 completes a circuit to start the operation of the phonograph motor 260 (270, switch 227, 279, motor 260, 271). The first operation of the motor turns the cam 259 to close the carry-over switch 256 and to complete the usual carry-over circuit for the motor in parallel with the circuit just described. The carry-over circuit remains closed until the phonograph parts have made a complete cycle so that the completion of each cycle is independent of the main switch 227. At any convenient time in the cycle of operations after the closing of the carry-over switch 256, switch 255 is momentarily closed and completes a circuit for the check-off magnet 234 of the local counter (transformer 272, 273, switch 255, 280, magnet 234, 274, transformer 272). Each such operation checks off a coin value on the local counter and moves the pin 226 toward the main switch 227. When the last coin value is checked off during the cycle for the last record paid for, the main switch 227 is opened and switch 278 is closed with no immediate result.

At any convenient time in the cycle of phonograph operation, after the operation of switch 255 and before the carry-over switch 256 is again opened, switch 254 is momentarily closed. As long as there are selections paid for and yet to be played the operation of switch 254 has no effect since it is in series with switch 228 and the latter switch is open as long as the main switch 227 is closed. During the cycle for the playing of the last record selected and paid for, the operation of switch 254 takes place after the main switch 227 has been opened and the switch 228 closed and while the motor is running on the carry-over circuit through switch 256. Under these conditions, a circuit is completed for actuation of the magnets 150 and 177 (transformer 272, 273, switch 228, 281, switch 254, 282, magnets 150 and 177, 274, transformer 272). The operation of the magnet 150 resets all of the selector pins 95 remaining in selected position and the operation of magnet 177 similarly resets all of the remaining manual selector pins 172.

In the type of mechanical connections to the phonograph described herein, the selected pins 95 and 172 are individually reset as the selections are played by the phonograph, still it is possible that some of the manual selector pins 172 may have been inadvertently placed in selected position and no corresponding payment made. In that case, some of the selections played may have been controlled by the operation of these manual selector pins, leaving a corresponding number of the pins 95 in the selected poistion. The operation of magnets 150 and 177 therefore insures that all of the remotely controlled pins and the manually controlled pins are returned to idle position at the completion of playing of a group of records. With other types of mechanical connection to the phonograph, the pins are not individually reset as used and the operation of magnets 150 and 177 is then relied upon for returning all of said pins to idle condition.

After the opening of the main switch 277 during the cycle of operations of the last record paid for, the operation of motor 260 continues until the cycle has been completed, whereupon cam 259 opens carry-over switch 256 and stops the motor. The parts have now returned to their original positions. Further operations either by remote control or by manual control may be initiated at any time after completion of the scanning movement of member 61.

The invention has been described in a preferred form applied to a particular type of controlled machine. Variations in the details thereof and the mode of application to other types of machines will be obvious to those skilled in the art. Coin control may be omitted in many cases and the changes in wiring for such omission will be apparent.

The invention claimed is:

1. In selective control apparatus for electrical musical instruments and the like, a plurality of selector members manually movable from a non-selected to a selected position, said members being biased toward non-selected position, a latch associated with each of said members and adapted to retain the same in selected position, and a scanning member movable to engage said latches successively to trip the same and permit the associated selector members to return to non-selected positions.

2. In selective control apparatus for electrical musical instruments and the like, a plurality of selector members manually movable from a non-selected to a selected position, said members being biased toward non-selected position, a latch associated with each of said members and adapted to retain the same in selected position, and a manually operated cancelling mechanism adapted simultaneously to trip all of said latches to permit said selector members to return to non-selected position.

3. In remote control apparatus for selectively operated machines, a transmitter including a plurality of selectively operable selector members movable from non-selected to selected positions, a rotatable scanning arm, an electric switch mounted on said arm, and a switch operating member carried by said arm and adapted to engage each of the selected selector members and to actuate said switch in response to said engagement.

4. In remote control apparatus for selectively operated machines having a local receiver adapted to operate said machine in response to indexing and selecting signals electrically received, the combination of a plurality of remotely positioned manually operated selector members movable from non-selected to selected positions, a rotatable scanning arm, an electric switch mounted on said arm and electrically connected to said receiver to give said indexing signals when actuated, a switch operating member carried on said arm and engageable with each of said selector members whether selected or not and actuating said switch when so engaged, a second electric switch mounted on said arm and electrically connected to said receiver for giving said selection signals, and a second switch operating member on said arm engageable only with the selected selector members and actuating said second switch when so engaged.

5. In a remote control apparatus for a selective record playing musical instrument or the like having a receiver adapted to control the selective operation of said instrument, a remotely positioned motor, and an impulse operated register device and associated circuits controlling the operation of said motor, the sub-combination of a plurality of selectively operable remote selector members movable to non-selected and to selected positions, a scanning member movable progressively over the selected positions of said selector members during a cycle of operation, said scanning member being moved by operation of said motor, an electrical circuit, said circuit being controlled by the engagement of said scanning member with the selected selector members to transmit controlling signals to said receiver, a starting circuit for said motor conditioned for operation by the register device when one or more impulses have been registered thereby, a manually controlled switch in said starting circuit adapted to complete the same to start the motor when so conditioned, a carry-over circuit for said motor including a switch closed upon the initial movement of said motor and adapted to continue operation of said motor until a complete cycle of said scanning member is completed, check-off means controlled by said scanning member to check off a registration from said register device each time a controlling signal is transmitted, and electrical means operated by the register device and controlling said first-mentioned circuit to prevent transmission of signals therein after the last of such registrations has been checked off.

6. In a coin controlled remote control apparatus for a selective record playing musical instrument or the like having a receiver adapted to control the selective operation of said instrument, a remotely positioned motor, and an impulse operated register device and associated circuits controlling operation of said motor, the sub-combination of a plurality of selectively operable remote selector members movable to non-selected and to selected positions, a scanning member movable progressively over the selected positions of said selector members during a cycle of operation, said scanning member being moved by the operation of said motor, an electric circuit, said circuit being controlled by the engagement of said scanning member with the selected selector members to transmit controlling signals to said receiver, a coin counter adapted to register the value of coins received in terms of records to be played, a starting circuit for said motor conditioned for operation by the said coin counter when one or more coins have been received, a manually controlled switch in said starting circuit adapted to complete the same to start the motor when so conditioned, and a carry-over circuit for said motor including a switch closed upon the initial movement of said motor and adapted to continue operation of said motor until a complete cycle of said scanning members is completed.

7. In a remote control apparatus for selective musical instruments or the like, having a remote transmitter, a local receiver including a register device, electrical connections between said transmitter and receiver adapted to transmit indexing signals and selection signals from said member to said receiver, a plurality of transmitter selector members movable to non-selected and to selected positions, corresponding receiver selector members each adapted when placed in the selected position to control an operation of said instrument, a receiver scanning member movable progressively in response to said indexing signals to register successively with said receiver selector members, a transmitter scanning member movable progressively over the selected positions of said transmitter selector members during a cycle of operation, electrical means controlled by the movement of the transmitter scanning member to send said indexing signals at predetermined intervals to move the receiving scanning member in synchronism therewith and to send said selection signals when the transmitter scanning member engages a selected selector member, means for limiting the number of selection signals which may be transmitted and interrupting transmission of the indexing signals after the last selection signal has been transmitted, and means operated automatically upon cessation of said indexing signals for returning the receiver scanning member to its initial position.

8. In a remote control apparatus for a selective record playing musical instrument or the like having an impulse operated register device, a local receiver provided with a plurality of selector members each adapted when placed in the selected position to control an operation of said instrument, a scanning member movable progressively over the selected positions of said selector members during a cycle of operation in response to indexing signals and movable in response to a selection signal to place in selected position the selector member with which it is then in registry, a remote transmitter electrically connected to said receiver operable to transmit said indexing signals at regular intervals and operable to transmit said selection signals in accordance with selections manually made, means controlled by said register device operable to limit the number of selection signals which may be transmitted in accordance with impulses received thereby and for interrupting transmission of indexing signals after the last selection signal has been transmitted, and means operated automatically upon cessation of said indexing signals for returning said scanning member to its initial position.

9. In a remote control apparatus for a selective record playing musical instrument or the like having an impulse operated register device, a plurality of remotely controlled selector members each adapted when placed in a selected position to determine a selection to be rendered during one cycle of operation of said instrument, a plurality of corresponding manually operated locally controlled selector members similarly controlling the operation of said instrument, means controlled by said register device operable to determine the number of selections to be successively rendered as a group, and means automatically operated by said instrument during the cycle of the last selection of said group to return to a non-selected position all of said remotely controlled and manually operated selector members then remaining in selected position.

10. In a remote control apparatus for a selective record playing musical instrument or the like having an impulse operated register device, a plurality of remotely controlled selector members each adapted when placed in a selected position to determine a selection to be rendered during one cycle of operation of said instrument, a plurality of corresponding manually operated locally controlled selector members similarly controlling the operation of said instrument, means controlled by said register device operative to determine the number of selections to be successively rendered as a group, electrically operated means operable to return all of said remotely controlled and manually operated selector members to a non-selected position, a switch actuated at a predetermined time in each cycle of operation of said instrument, a second switch operated by said register device and actuated during a portion of the last cycle of the group, and an electric circuit for actuating said electrically operated means, said circuit being associated with both of said switches and operating said electrically operated means only when both of said switches are actuated.

FRED H. OSBORNE.
THEODORE M. WRIGHT.